Figure 1:
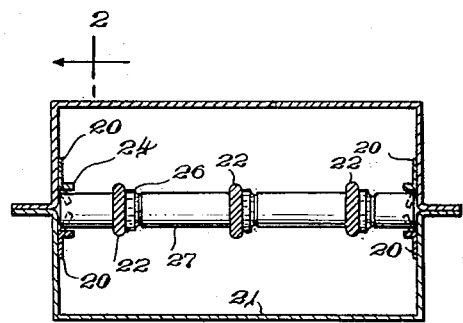

Aug. 13, 1940.  W. H. FRANK ET AL  2,211,109
ELECTRICAL DISTRIBUTION SYSTEM
Original Filed Dec. 4, 1936

INVENTORS
William H. Frank
BY Lawrence E. Fisher
Daniel G. Cullen ATTORNEY.

Patented Aug. 13, 1940

2,211,109

UNITED STATES PATENT OFFICE 2,211,109

ELECTRICAL DISTRIBUTION SYSTEM

William H. Frank and Lawrence E. Fisher, Detroit, Mich.

Original application December 4, 1936, Serial No. 114,261. Divided and this application February 14, 1938, Serial No. 190,457

1 Claim. (Cl. 174—99)

This application relates to electrical distribution systems of the bus duct type comprising duct or casing in which are disposed and suitably supported electrical conductors such as bus bars and is a division of our prior application Serial No. 114,261 of December 4, 1936, now Patent No. 2,116,676, dated May 10, 1938.

In a prior patent, No. 2,041,675 of May 19, 1936, there is disclosed a bus duct distribution system similar to the one hereof and similarly provided with openings in the duct through which may be inserted prongs of branch circuit take-off devices for engaging the bus bars and establishing connections between them and the terminals of the branch circuit take-off devices. In that patent there is shown as an arrangement for supporting the bus bars within the duct in an insulated manner, transverse plates 28 of insulation which are so proportioned as to divide the duct into cells, and a substantially close fit was provided between the bus bars and the slots of the plates through which these passed, and a similar close fit was provided to insure the cells being sealed from one another to a substantial degree.

Now, it has been discovered that in the use of the duct illustrated in Patent No. 2,041,675 there occurred some few instances of burning of duct due to arcs formed incident to electrical surges, leakage, loose connections, insulation breakdowns, and other causes and it was further discovered that this burning of duct was due to the fact that the barriers 28 operated to prevent the free travel of arcs along the bus bars and that the thus confined arcs burned the duct or casing at points near where the arcs were formed. After considerable study, it was discovered that burning of duct due to arcs could be eliminated and prevented by so designing the bus bar supports that they permitted the arcs formed to run the full length of the duct freely and quickly and without interference to a point where they could be dissipated safely, reliance being placed upon magnetic force created by the current in the bus bars to cause the arc to travel quickly along the duct to the dissipating center.

It was discovered that as long as the arc was permitted to travel freely and rapidly along the bus bars, no damage to the duct would occur, provided a suitable dissipating center was provided for the arcs which course the duct. However, as stated above, when an obstruction to the coursing of the arc existed, sufficient to stop the arc, the arc burned the duct and in some instances the bus bars as well.

For example, the insulators shown at 28 of Patent No. 2,041,675 provide such obstructions and consequently cause arcs to stop at the insulators, resulting in burning at such insulators, and in some cases causing arcs to be formed in neighboring cells due to the fact that gases arising on arcing in a cell would flow past the support into the next cell and create new arcs in such other cell.

In this application there are disclosed bus supporting means designed to permit free coursing of arcs along the duct.

Figure 2A:
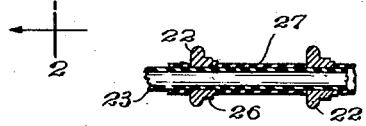
Figure 2:
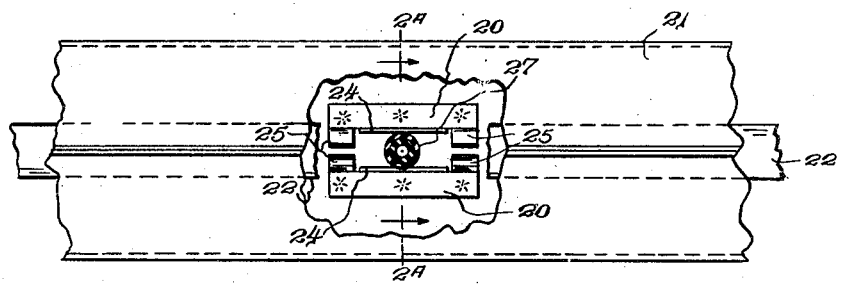

For an understanding of the supporting means here shown, reference should be had to the appended drawing. In the drawing, Fig. 1 shows a duct in cross section provided with such arrangement for supporting bus bars;

Figs. 2 and 2a are sections on lines 2—2 and 2a—2a, Figs. 1 and 2.

In the arrangement of Figs. 1–2a, metal plates 20 are shown as welded to the duct 21 at longitudinally spaced intervals not too close to the openings, not shown, through which prongs may be inserted into the duct for engagement with the bus bars 22 which are apertured to permit an insulation hollow pin or tube 23 to be passed therethrough and have its ends received between the outwardly bent lugs 24 of the metal plates 20 whereby the tubes will be supported from the duct and will be prevented from shifting up and down in the duct, it being observed that longitudinal shifting of the tubes and the bus bars, to compensate for misalignment, manufacturing tolerance, and expansion due to temperature rises is permitted to some extent, with the parts restrained against excessive shifting by lugs 25 bent outwardly from the metal plates 20. The edges of the holes of the bus bars through which pass the tubes 23 are extruded or flanged as shown at 26 to provide the bus bars with their original or full cross sections for current carrying purposes and to form suitable bearings for the bus bars and tubes, and between the bus bars and telescoped around the tubes 23 there are spacer tubes 27 arranged as shown.

The arrangement here shown has been found satisfactory for supporting bus bars in duct and has also been found to permit free coursing of arcs in duct.

We claim:

A bus duct comprising a long run of casing, elongated naked bus runs therein, these comprising long bus bars of ribbon form, having opposed wide surfaces and opposed narrow edges, and means for supporting the bus runs from the duct so constructed as not to engage or cover the narrow edges of the bus runs and thus to avoid interfering with the free coursing of arcs along such edges, the means comprising longitudinally spaced pins connecting and mounted on opposite sides of the duct and passing through holes of the bus runs opening to the wide surfaces of the bus runs, the pins being insulated from the bus bars.

WILLIAM H. FRANK.
LAWRENCE E. FISHER.